Figure 1:
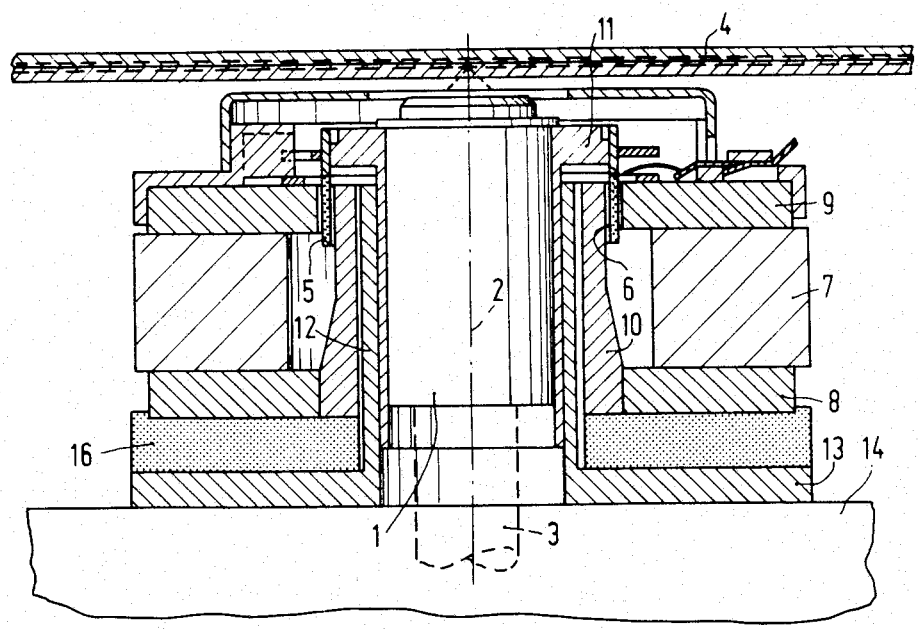

United States Patent [19]

Houbregs et al.

[11] Patent Number: 4,490,011
[45] Date of Patent: Dec. 25, 1984

[54] OPTICAL DEVICE

[75] Inventors: Roger J. E. Houbregs; Eduard Camerik, both of Eindhoven, Netherlands

[73] Assignee: U.S. Philips Corporation, New York, N.Y.

[21] Appl. No.: 437,387

[22] Filed: Oct. 28, 1982

[30] Foreign Application Priority Data

Jun. 17, 1982 [NL] Netherlands ............... 8202451

[51] Int. Cl.³ .................................. G07B 7/04
[52] U.S. Cl. ........................ 350/255; 369/45; 369/112
[58] Field of Search ............ 350/255, DIG. 3; 369/45, 112, 115

[56] References Cited

U.S. PATENT DOCUMENTS 4,021,101  5/1977  Camerik ................. 350/255
4,032,776  6/1977  van Rosmalen ........... 369/45
4,252,412  2/1981  Camerik ................. 369/112

Primary Examiner—Bruce Y. Arnold
Assistant Examiner—William Propp
Attorney, Agent, or Firm—Robert S. Smith

[57] ABSTRACT

In an optical device an objective is moved axially along its optical axis relative to a frame in a parallel guide by means of first electro-magnetic actuating means connected to the objective and second electromagnetic actuating means arranged on the frame, which first and second actuating means co-operate axially with each other by means of a magnetic field which is oriented transversely of the optical axis and transversely of the direction of movement of the objective. In order to suppress vibrations caused by axial reactive forces transmitted from the second actuating means to the frame, axially resilient damping means are arranged between the frame and at least a part of the second actuating means. The movements of the second actuating means do not affect the position of the objective because an axial displacement of the radial magnetic field does not give rise to an axial movement of the objective.

6 Claims, 5 Drawing Figures

OPTICAL DEVICE

The invention relates to an optical device comprising: a frame; an axially movable objective with an optical axis; a parallel guide for the axial guidance of the objective; and an electromagnetic actuating device for the objective, which device comprises first actuating means connected to the objective and second actuating means arranged on the frame, which first and second actuating means axially co-operate with each other in an air gap with a magnetic field which is oriented transversely of the optical axis.

Such optical devices are used in increasing quantities, in particular as focussing devices for focussing a light beam on an optical disk. An optical focussing device for an optical video-disk player is known, for example from U.S. Pat. No. 4,021,101 (herewith incorporated by reference). In this known device the actuating means comprise an axially magnetized annular permanent magnet which is arranged concentrically around an objective and a soft-iron yoke with pole-pieces on each side of the annular magnet and a soft-iron sleeve which is connected to one of the pole-pieces and which is spaced from the other pole-piece by an annular gap. The first actuating means comprise an annular coil which is connected to the objective and which moves in the annular gap of the soft-iron yoke. Said sleeve is disposed in the center of the annular magnet. Parallel guidance of the objective is provided by a slide-bearing arrangement. In the soft-iron sleeve a bearing bushing is mounted and the objective is arranged with a mount which is an accurate axially slidable fit in the bearing bushing. The lower soft-iron pole-piece is flange-shaped and is used for securing the device to a carriage which is radially movable relative to a video disk.

In the present Application "frame" is to be understood to mean that part of the device which serves for securing the device in an apparatus and all other parts which are rigidly connected thereto. In the known optical device the frame comprises the annular magnet and the soft-iron yoke and means arranged on the upper side of the yoke for shielding and electrically connecting the objective. Via the air gap the second actuating means which are arranged on the frame exert magnetic forces on the first actuating means which are connected to the objective.

As in general the objective has a mass which is not negligible and in some cases, for example in video-disk players in which the objective should be movable fairly rapidly along its optical axis, the said forces are substantial. As a result of this, the reactive forces exerted on the second actuating means are also substantial. Therefore, the frame of the optical device may be subject to mechanical vibrations and transmit these to the apparatus in which the optical device is used. This may be undesirable for a variety of reasons. In video-disk players, for example, other optical devices arranged in the light path may be set into vibration, which may give rise to cross-talk between the various optical devices.

The invention aims at providing an optical device of the type mentioned in the opening paragraph in which the vibrations transmitted to the frame are reduced and is characterized in that axially resilient damping means are arranged between the frame and at least a part of the second actuating means, for damping the axial forces exerted on the frame by the part of the second actuating means. Thus, in the device in accordance with the invention the second actuating means is arranged on the frame via said axially resilient damping means. Surprisingly, axial movements of the second actuating means relative to the frame and consequently relative to the objective do not disturb the focussing of the objective. This is because the magnetic field in the air gap is oriented transversely of the optical axis and axially co-operates with the first actuacting means. Small axial displacements of the second actuating means therefore do not affect the co-operation between the first and the second actuating means. An embodiment of the invention which is of interest in this respect is characterized in that the frame is provided with a parallel guide for the axial guidance of the second actuating means. This ensures that the second actuating means cannot inadvertently perform movements other than axial movements.

As already stated, the afore-mentioned known focussing device comprises a parallel guide for the objective, which guide comprises a bearing bush. In optical devices of this construction it is advantageous to use an embodiment of the invention which is characterized in that the bearing bushing is rigidly secured to the frame and is made of a non-magnetizable material. When the bearing bushing is rigidly secured to the frame the axially moving second actuating means cannot exert variable frictional forces on the objective. However, it is then of importance that the stationary bearing bushing is made of a non-magnetizable material, because otherwise it is inevitable that substantial, variable, radial forces are exerted on the moving second actuating means. Indeed, the bearing bushing is disposed near the comparatively strong permanent magnet so that the slightest deviation of the bearing-bushing position from the magnetic center of the annular magnet gives rise to substantial radial forces.

It is found to be interesting, in accordance with an embodiment of the invention, to use damping means made of butyl rubber. In addition to resilient properties this type of rubber has excellent damping properties and moreover it can be formed easily into any desired shape.

It is advantageous to modify the afore-mentioned known focussing device so as to obtain an embodiment of the invention which is characterized in that the entire second actuating means are supported resiliently by the frame and the resilient damping means comprise leaf-spring means connected to the second actuating means and to the frame and rubber isolating means between the frame and the leaf-spring means. Suitably, use is made of an embodiment which is characterized in that the leaf-spring means comprise a single leaf-spring member which is manufactured integrally and which comprises a plurality of leaf springs which extend substantially tangentially and which are spaced from the remainder of said member by punched-out slots.

Figure 2:
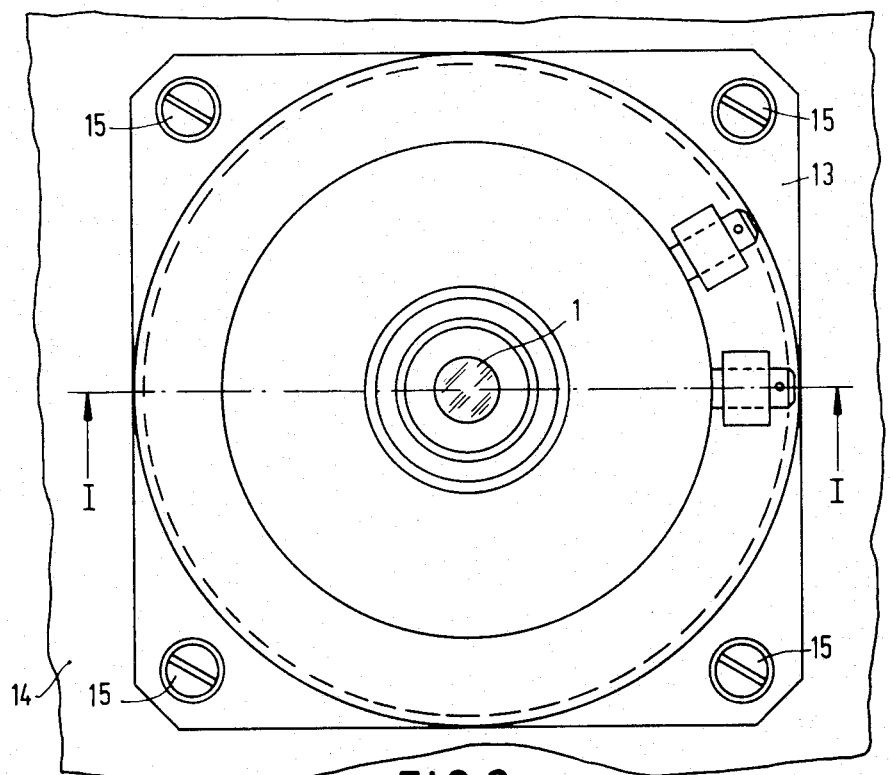
Figure 3:
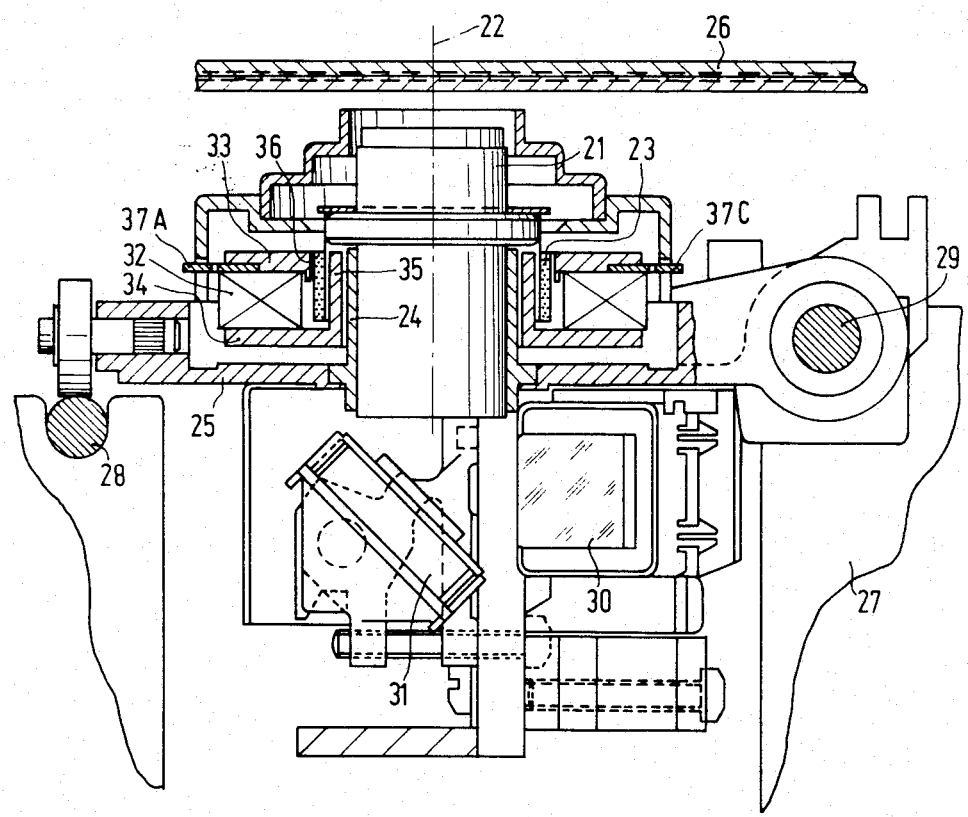
Figure 4:
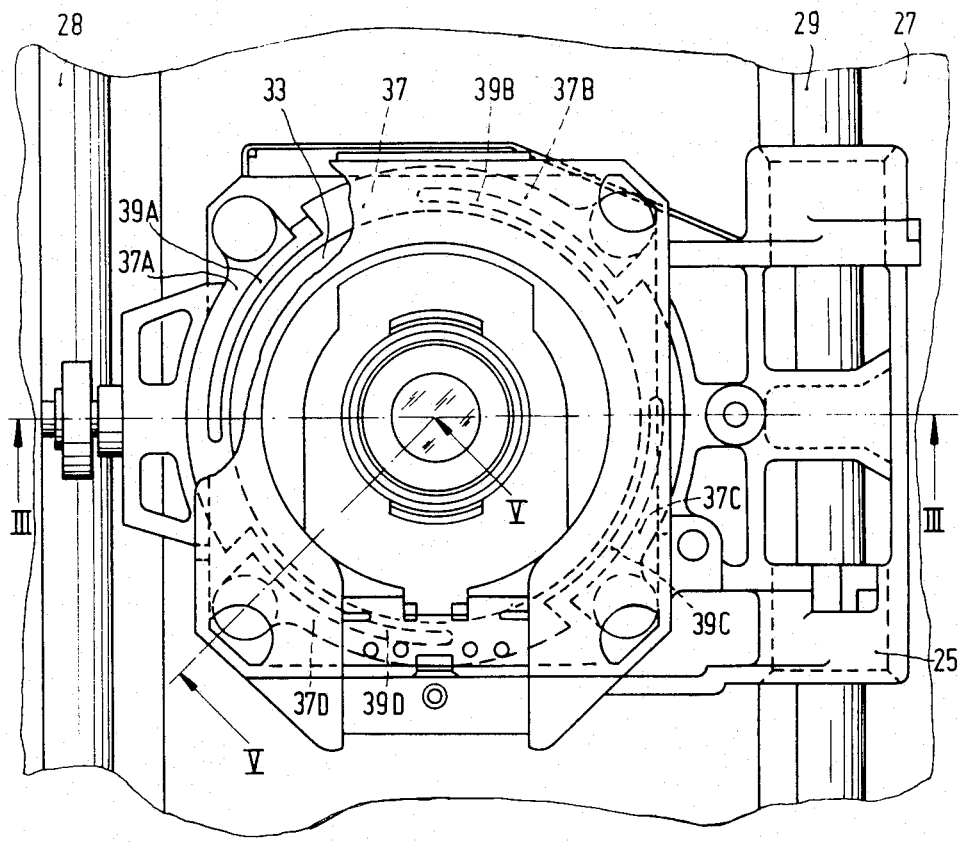
Figure 5:
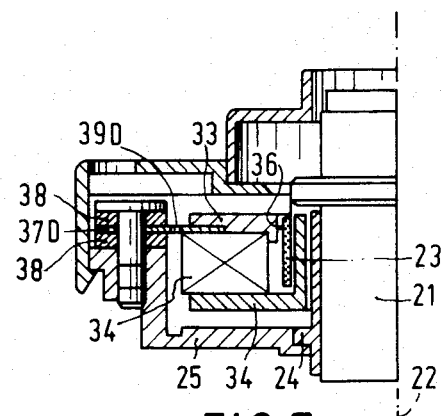

The invention will now be described in more detail, by way of example, with reference to the drawing, in which:

FIG. 1 is a sectional view of an optical focussing device (taken on the line I—I in FIG. 2), FIG. 2 is a plan view of the focussing device shown in FIG. 1, FIG. 3 is a sectional view of another focussing device (taken on the line III—III in FIG. 4), FIG. 4 is a plan view of the focussing device shown in FIG. 3, and FIG. 5 is a part of a sectional view of the optical focussing device shown in FIGS. 3 and 4, taken on the line V—V in FIG. 4.

FIGS. 1 and 2 show an optical focussing device for a video-disk player, which device is a modification to the optical focussing device known from the afore-mentioned U.S. Pat. No. 4,021,101.

An objective 1 with an optical axis 2 is axially movable in order to focus a light beam 3 onto a rotary video disk 4. The objective 1 is actuated by an electro-magnetic actuating device which comprises first actuating means, comprising an annular coil 5 which is connected to the objective 1, and second actuating means which co-operates axially with the coil 5 in an air gap 6 with a permanent-magnetic field which is oriented transversely of the optical axis 2. The second actuating means comprises an axially magnetized annular permanent magnet 7 which is arranged concentrically around the objective and a soft-iron yoke comprising pole-pieces 8 and 9 on each side of the annular magnet and a soft-iron sleeve 10 which is connected to the pole-piece 8 and which is spaced from the other pole-piece 9 by an annular air-gap 6.

The objective is disposed in a mount 11. The parallel guide for axially guiding the objective comprises a bearing bushing 12, the mount 11 being an accurate axially slidable fit in said bushing. The bearing bushing is integral with a frame plate 13 by which the device is secured to a carriage 14 of the video-disk player by means of four bolts 15. The frame plate 13 and the bearing bushing 12 are made of a non-magnetic material, for example aluminium or a copper alloy.

Between the plate 13 and the second actuating means—which as already stated comprises the annular magnet 7, the pole-pieces 8 and 9 and the housing 10—there are arranged damping means in the form of a layer of foam rubber 16. This layer is slightly resilient in the axial direction and has also damping properties. Suitably, the layer is made of butyl rubber, which has excellent damping properties. The axial forces exerted on the frame by the second actuating means are damped by the layer of foam rubber 16. The pole-piece 8, the layer of foam rubber 16, and the frame 13 may be connected rigidly to each other, for example, by gluing. This counteracts radial displacements of the annular magnet 7 and the soft-iron yoke.

The optical focussing device shown in FIGS. 3 to 5 is also a modification to an optical focussing device known from the aforementioned U.S. Pat. No. 4,021,101. The objective 21 is axially movable along an optical axis 22 and is actuated by means of an annular coil 23. The objective 21 is mounted in a bearing bushing 24 which is rigidly connected to a frame 25. This frame is capable of performing radial translational movements relative to an axis of rotation of a video disk 26. For this purpose the frame 17 of the video-disk player in which the optical focussing device is used comprises two guide rods 28 and 29.

In addition to the focussing device two further electro-dynamically controlled optical devices are secured to the frame 25, namely two pivotal mirrors 30 and 31. These mirrors are arranged in such a way that a light beam emitted by a laser and oriented in accordance with the axes 28 and 29 is first reflected by the mirror 30 and subsequently by the mirror 31, after which it is focussed onto the video disk 26 by the objective 21. In the drawing the laser beam is not shown and the objective 21 is shown in its rest position, i.e. in its lowermost position.

In the same way as in the device shown in FIGS. 1 and 2, the second actuating means, which are arranged on the frame of the focussing device, comprise an axially magnetized annular magnet 32, a pole-piece 33, a pole-pieve 34 and a sleeve 35 which is spaced from the pole-piece 33 by an annular air gap 36. In the air gap 36 a radially oriented permanent-magnetic field exists, which permits the coil 23 to be actuated axially. The entire second actuating means, i.e. the annular magnet 32 with the soft-iron yoke, are resiliently supported by the frame and the resilient damping means comprise four leaf springs 37A to 37D, which are connected to the second actuating means and to the frame, and a plurality of butyl-rubber rings 38, see in particular FIG. 5. By the use of accurately identical rings a substantially equal damping is obtained at the four corners. This precludes problems as a result of asymmetrical damping. The leaf springs 37A to 37D form part of an integrating manufactured leaf-spring member 37, are oriented substantially tangentially, and are spaced from the remainder of the leaf-spring member 37 by punched-out slots 39A to 39D.

In addition to the two embodiments shown in the drawing various other embodiments are possible within the scope of the invention as defined in the claims. As already stated the two embodiments shown are modifications to a known optical focussing device. However, the same principles may be applied to other optical devices. Furthermore, the invention may be used to advantage in other focussing devices which differ from the focussing devices which differ from the focussing devices shown in the drawing as regards the parallel guide of the objective and the construction of the actuating means. For example, it is possible to use the invention in focussing devices in which the parallel guide of the objective does not comprise a slide-bearing arrangement but a resilient objective-suspension (see for example the article "Control Mechanisms in the Philips 'VLP' Record Player" by P. J. M. Hanssen and P. E. Day, 1973, No. 7, pages 190 to 193 (herewith incorporated by reference)). Alternatively, an electro-dynamic parallel guide may be used, for this see the Applicant's previously filed U.S. patent application Ser. No. 313,701 filed Oct. 21, 1981 which has not been published previously (herewith incorporated by reference). These two references also describe other constructions of the actuating means. In the focussing device described in the first-mentioned reference the first actuating means are disposed on the underside of the device, while the second reference shows and describes a number of different devices with actuating means of an entirely different construction. Alternatively the first actuating means may comprise permanent-magnetic parts and the second actuating means may comprise one or more coils. Instead of permanent-magnetic means electro-magnetic means may be employed.

It has been found that in a focussing device as shown in FIGS. 3 to 5 the tolerance of the device to vertical oscillations of the position of the video track on the disk increases substantially, namely by a factor of at least 10. The mass of the objective is approximately 7.5 grammes, the permanent magnet plus the yoke having a mass which is about six to ten times as high. The maximum acceleration of the objective during operation is a video disk player is approximately 100 m/sec$^2$, so that reactive forces of approximately 0.75N are exerted on the second actuating means. The magnetic field in the air gap is homogeneous within an axial range of 3 to 4 mm. The amplitude of the objective movement at low frequencies is 0.5 to 1.5 mm, the amplitudes decreasing at higher frequencies.

The bandwidth of the automatic focussing control loop in an optical video-disk player is approximately 5 kHz. The movements of the objective produce a certain sound pressure in a frequency range to which the human ear is very sensitive. Depending on the construction the invention may have the additional advantage that the sound pressure is reduced by the movements of the second actuating means. If the objective and the second actuating means move in opposite directions, the sound pressures will also be opposed to each other and will consequently cancel each other at least partly.

What is claimed is:

1. An optical device comprising:
    a frame;
    an axially movable objective with an optical axis;
    a parallel guide arrangement for the axial guidance of the objective; and
    an electromagnetic actuating device for said objective, which device comprises a first actuating means connected to said objective and a second actuating means arranged on said frame, said first and second actuating means axially co-operate with each other in an air gap with a magnetic field which is oriented transversely of said optical axis, characterized in that an axially resilient damping means is arranged between said frame and at least a part of said second actuating means for damping the axial forces exerted on said frame by said part of said second actuating means.

2. An optical device as claimed in claim 1, characterized in that said frame is provided with a parallel guide for said axial guidance of the second actuating means.

3. An optical device as claimed in claim 1, wherein the parallel guide for the objective comprises a bearing bushing, characterized in that said bearing bushing is rigidly secured to said frame and is made of a non-magnetizable material.

4. An optical device as claimed in claim 1, characterized in that said damping means is made of butyl rubber.

5. An optical device as claimed in claim 1, wherein said second actuating means comprises:
    an axially magnetized annular permanent magnet which is arranged concentrically around said objective; and
    a soft-iron yoke having pole-pieces on each side of said annular magnet and a soft-iron sleeve which is connected to one of said pole-pieces and which is spaced from the other pole-piece by an annular gap, said first actuating means comprising an annular coil which moves in the annular gap of said soft-iron yoke; characterized in that
    all of said second actuating means is supported resiliently by said frame, and
    the axially resilient damping means comprise:
        leaf-spring means connected to the second actuating means and to the frame, and
        rubber isolating means between the frame and the leaf-spring means.

6. An optical device as claimed in claim 5, characterized in that the leaf-spring means comprises a single leaf-spring member which is manufactured integrally and which comprises a plurality of leaf-springs which extend substantially tangentially and which are spaced from the remainder of said leaf-spring member by punched-out slots.

* * * * *